Patented Oct. 18, 1938

2,133,301

UNITED STATES PATENT OFFICE 2,133,301

INSULATING COMPOSITIONS

Herbert E. Martin, Cumberland, Md., assignor to Celanese Corporation of America, a corporation of Delaware No Drawing. Application February 17, 1937, Serial No. 126,253

2 Claims. (Cl. 91—68)

This invention relates to compositions for use as insulators against heat (temperature change), sound or electricity, and relates more particularly to insulating compositions comprising organic esters of cellulose of high degree of esterification.

An object of this invention is the provision of an insulation material that absorbs little or no moisture. A further object of this invention is the use of compositions comprising cellulose acetate or other organic esters of cellulose of high degree of esterification as insulation material in devices, chambers, buildings or other places, where insulation against heat (temperature change), sound and/or electricity is required or desirable. Other objects of this invention will appear from the following detailed description and the appended claims.

The heat or sound insulation materials in the solid state that have been used heretofore are of the nature of cork, cotton, silk floss, or "dry-zero" (a product that grows on a certain bean tree in tropical South America). These substances, however, have the serious drawback of tending to absorb moisture from the atmosphere, whereby their effectiveness as insulating materials is materially lessened. Moreover, they also increase in weight, a phenomenon obviously objectionable in devices or articles of manufacture that are intended to be moved about. In order to maintain or restore the efficiency of these materials, it is necessary to remove them from their jackets or chambers in which they are contained, drive out the water, and then return them to the containers. Such a process is expensive and causes a loss of use of devices or articles of manufacture during the process of driving out the water from the insulating materials.

It has been proposed to use as insulation material a composition containing a cellulose acetate ordinarily used for commercial purposes. Such a cellulose acetate is not a fully acetylated cellulose corresponding to cellulose triacetate, but usually has an acetyl value of less than 55%. This acetyl value and those hereinafter specified are determined as acetic acid. While compositions comprising such cellulose acetate are better insulators than those formerly employed, I have found that compositions comprising cellulose acetate or other organic esters of cellulose of high degree of esterification, particularly a cellulose acetate of high acetyl value made by reacetylating a cellulose acetate of lower acetyl value, have much higher insulating powers than ordinary cellulose acetate against heat, sound and electricity. Moreover, a cellulose acetate of high acetyl value absorbs much less moisture than the ordinary commercial cellulose acetate. For example, a cellulose acetate having 62.2% acetyl value is found to have an equilibrium moisture content of 2.5% in comparison with 6.3% for a regular commercial 54% acetyl cellulose acetate, when both are subjected to an atmosphere of 64% relative humidity at 78° F.

In accordance with my invention, I use materials made of or containing organic esters of cellulose of high degree of esterification as insulators against heat, sound or electricity in any device where insulation materials are required or are desirable.

Although this invention will be described specifically in connection with cellulose acetate, it is also applicable to other organic esters of cellulose such as cellulose formate, cellulose propionate and cellulose butyrate. While any cellulose acetate of high acetyl value, i. e. above 55%, say, from 60 to 64%, may be used in accordance with this invention, I have found that insulation materials made from a cellulose acetate having an acetyl value of 62.5%, and particularly a cellulose acetate of such high acetyl value made by reacetylating a cellulose acetate of lower acetyl value, are the most satisfactory with respect to their insulation properties.

Cellulose acetate of high acetyl value may be made in any suitable manner. For instance, a primary solution of cellulose acetate formed by acetylating cellulose with acetic anhydride and sulphuric acid in the presence of acetic acid may be subjected to a hydrolyzing or ripening action, and the ripening interrupted at such a point that the finished product contains the desired high acetyl value.

I have found, however, that materials of better insulating properties may be formed by employing a cellulose acetate of high acetyl value made by reacetylating a cellulose acetate of lower degree of acetylation. Thus, a cellulose acetate which is in a form ready for commercial use, i. e. a cellulose acetate which has been ripened, washed and stabilized and having, for instance, an acetyl value of between 54 and 55%, is employed as the starting material in the production of a cellulose acetate of high acetyl value. Such cellulose acetate of lower degree of acetylation is treated with acetic anhydride in the presence of an acetylizing catalyst. While zinc chloride, a mixture of zinc chloride and hydrochloric acid, phosphoric acid and sulphuric acid may be employed as the acetylizing catalyst, the use of perchloric acid is preferable when reacetylating a cellulose acetate of lower degree of acetylation. The amount of catalyst may vary from less than 1% to 10% or more, based on the weight of the cellulose acetate being treated, depending on the catalyst and degree of acetylation desired.

In one form of my invention the insulating material may comprise cellulose acetate of high acetyl value in the form of fibers or granules of appreciable size. In this form it is particularly useful for jacketing or enclosing refrigerators, such as household refrigerators or refrigerator railway cars. In this form it also may be used as a heat insulator in the walls of rooms and in the walls of cabins of aeroplanes and lighter-than-air aircraft. A further use for the use of cellulose acetate of high acetyl value in the form of fibers or granules is in the jackets of portable jars intended to maintain the contents thereof hot or cold for picnics and the like. Another use for the fibers or granules comprising cellulose acetate of high acetyl value is as an insulating material in fireless cookers. The fibers or granules may also be used as insulating material around pipes that are adapted to convey hot or cold fluids.

As an insulator against sound, the fibers or granules of cellulose acetate of high acetyl value may be used to fill walls of cabins of aeroplanes or airships, or partitions or walls of buildings.

The cellulose acetate of high acetyl value is eminently suitable for use as electrical insulation in any device where solid di-electrics are used. Since this material absorbs substantially no water, its electrical resistance does not tend to change even in damp atmospheres. Insulating compositions containing cellulose acetate of high acetyl value have an insulating value which is substantially 20 times greater than those containing ordinary commercial cellulose acetate. The insulating material containing cellulose acetate of high acetyl value may be in the form of fibers, powder, granules, varnish and molded or plastic articles, and a particularly useful form is yarn comprising a cellulose acetate of high acetyl value. In the form of yarn it is adapted to be wrapped around electrical wires for both decorative and insulating purposes.

The starting material for making yarn of cellulose acetate of high acetyl value which is suitable for use for insulating wrappings for electrical wires is the ordinary commercial acetone-soluble cellulose acetate yarn, which yarn may be processed in any suitable manner. For example, the yarn, before the reacetylating treatment, may be pigmented, dyed, loaded, stretched or shrunk or may be given any other desired treatment. The commercial aceton-soluble cellulose acetate yarn is subjected to a reacetylating medium while it is in any suitable form. For example, hanks of the yarn may be immersed for an appropriate period of time in the reacetylating medium maintained at a suitable temperature, or the reacetylating medium may be forced, by pumping or by suction, through perforated bobbins on which the yarn is wound.

Where flexibility in the product is desired or where molded or plastic articles are to be made, plasticizers or modifiers may be used with the cellulose acetate of high acetyl value, the amount of plasticizer or modifier employed depending upon the use to which the cellulose acetate of high acetyl value is to be put. Preferably, however, substantially large amounts of plasticizer are employed with high acetyl value cellulose acetate, i. e. above 35%, based on the weight of the cellulose acetate present. Examples of suitable plasticizers or modifiers which may be used with a cellulose acetate of high acetyl value are dibutyl tartrate, dimethyl phthalate, diethyl phthalate, dibutyl phthalate, di(methoxy ethyl) phthalate, ortho- and para-ethyl toluene sulphonamide, triphenyl phosphate, triacetin, etc.

In working up the cellulose acetate of high acetyl value in accordance with this invention, there may be used suitable volatile solvents, such as tetrachlorethane, methylene chloride, chloroform, ethylene chlorhydrin, ethylene formal, phenol, cresol, and mixtures of ethylene dichloride and methyl alcohol, tetrachlorethane and methyl alcohol, phenol and benzol, and cresol and benzol. Ethylene formal was found to be particularly effective as a solvent for cellulose acetate having an acetyl value of 62.5% formed by reacetylating a cellulose acetate of lower acetyl value.

In order further to illustrate my invention, but without being limited thereto, the following specific examples are given:

*Example I*

A cellulose acetate that is soluble in acetone and having an acetyl value of 54 to 55% is employed for reacetylation. This cellulose acetate may have been prepared by acetylating cellulose with a mixture of acetic anhydride and sulphuric acid and ripened, washed, stabilized and dried in a form ready for ordinary uses. The cellulose acetate may, for instance, be prepared by any of the processes described in the U. S. patents to Henry Dreyfus, Nos. 1,278,885; 1,280,974; 1,280,975; and particularly No. 1,708,787.

A mixture of 5 parts by weight of the commercial acetone-soluble cellulose acetate, 45 parts of 95% acetic anhydride, 0.83 part of zinc chloride and 0.17 part of 33% hydrochloric acid suspended in 41.5 parts of benzene is allowed to stand for 24 hours at room temperature. The mixture is then drained from the cellulose acetate and the cellulose acetate heated to drive off the residual benzene. The cellulose acetate is then washed neutral and dried. The reacetylated cellulose acetate has an acetyl value of 62.5% and absorbs substantially no water when exposed to damp atmospheres.

*Example II*

7.5 parts by weight of acetone-soluble yarn in hank form is laid upon a perforated false bottom of a stainless steel tank and a light perforated stainless steel plate is placed on the top of the hanks to prevent the same from moving while in the bath. A reacetylation mixture comprising 15 parts of 92% acetic anhydride, 0.037 part of 60% perchloric acid (.26% on the weight of the yarn) and 150 pounds of benzene is then circulated through the yarn for 3½ hours at room temperature (25° C.). The yarn is then removed from the mixture, centrifuged to remove as much benzene/acid mixture as possible. The yarn is washed with hot water and then with cold water and finally dried.

This reacetylated yarn when wound on wire was found to have an insulating value substantially 20 times greater than the yarn had before it was reacetylated to the high acetyl value.

It is to be understood that the foregoing detailed description is given merely by way of illustration and many alterations may be made therein, without departing from the spirit of my invention.

Having described my invention, what I desire to secure by Letters Patent is:

1. Process for the production of insulated wire, which comprises covering the said wire with a composition comprising cellulose acetate having an acetyl value between 60 and 64%, determined as acetic acid, said cellulose acetate being formed by treating an acetone soluble cellulose acetate of lower acetyl value with acetic anhydride in the presence of an acetylizing catalyst selected from the group consisting of zinc chloride, a mixture of zinc chloride and hydrochloric acid, sulphuric acid and perchloric acid.

2. Process for the production of insulated wire, which comprises covering the said wire with a composition comprising cellulose acetate having an acetyl value of 62.5%, determined as acetic acid, said cellulose acetate being formed by treating an acetone soluble cellulose acetate of lower acetyl value with acetic anhydride in the presence of an acetylizing catalyst selected from the group consisting of zinc chloride, a mixture of zinc chloride and hydrochloric acid, sulphuric acid and perchloric acid.

HERBERT E. MARTIN.